(12) United States Patent
Gordon et al.

(10) Patent No.: US 7,482,720 B2
(45) Date of Patent: Jan. 27, 2009

(54) ROTOR AND ELECTRICAL GENERATOR

(75) Inventors: Paul Gordon, Crook (GB); Edward Spooner, Crook (GB)

(73) Assignee: Evolving Generation Limited, Crook, County Durham (GB)

( * ) Notice: Subject to any disclaimer, the term of this patent is extended or adjusted under 35 U.S.C. 154(b) by 232 days.

(21) Appl. No.: 10/477,530

(22) PCT Filed: Jun. 5, 2002

(86) PCT No.: PCT/GB02/02288

§ 371 (c)(1),
(2), (4) Date: Feb. 23, 2004

(87) PCT Pub. No.: WO02/099950

PCT Pub. Date: Dec. 12, 2002

(65) Prior Publication Data

US 2004/0150272 A1   Aug. 5, 2004

(30) Foreign Application Priority Data

Jun. 6, 2001   (GB) ................................. 0113700.9

(51) Int. Cl.
*F03D 5/04* (2006.01)
(52) U.S. Cl. .................... 310/75 C; 290/44; 290/55
(58) Field of Classification Search .................. 290/44, 290/54, 55, 43; 310/67 A, 67 R, 75 C
See application file for complete search history.

(56) References Cited

U.S. PATENT DOCUMENTS

| | | | | |
|---|---|---|---|---|
| 1,233,232 A | * | 7/1917 | Heyroth | 290/55 |
| 1,352,960 A | * | 9/1920 | Heyroth | 290/44 |
| 1,944,239 A | * | 1/1934 | Honnef | 290/55 |
| 3,387,152 A | * | 6/1968 | Mucke | 310/89 |
| 3,709,561 A | * | 1/1973 | De Biasse et al. | 301/6.8 |
| 4,258,280 A | * | 3/1981 | Starcevic | 310/157 |
| 4,285,481 A | * | 8/1981 | Biscomb | 244/33 |
| 4,289,970 A | * | 9/1981 | Deibert | 290/44 |
| 4,291,235 A | * | 9/1981 | Bergey, Jr. et al. | 290/55 |
| 4,306,157 A | * | 12/1981 | Wracsaricht | 290/54 |
| 4,318,019 A | | 3/1982 | Teasley et al. | 290/44 |
| 4,367,413 A | * | 1/1983 | Nair | 290/52 |
| 4,427,897 A | * | 1/1984 | Migliori | 290/44 |
| 4,584,486 A | * | 4/1986 | Quynn | 290/44 |
| 4,720,640 A | * | 1/1988 | Anderson et al. | 290/43 |
| 5,299,913 A | * | 4/1994 | Heidelberg | 290/55 |
| 5,315,159 A | * | 5/1994 | Gribnau | 290/55 |
| 5,590,946 A | | 1/1997 | Jung | 362/340 |

(Continued)

FOREIGN PATENT DOCUMENTS

DE   3629872 A   *   3/1988

(Continued)

*Primary Examiner*—Dang D Le
(74) *Attorney, Agent, or Firm*—Jacobson Holman PLLC

(57) ABSTRACT

A rotor for an electrical generator and a generator incorporating such a rotor, the rotor consisting of a central hub, a radially spaced concentric rim portion with rotor magnetic elements mounted upon it, and a plurality of elongate tension members extending generally between the hub and the rim, maintained substantially in tension so as to maintain the rim substantially in compression. The hub is rotatably driven by an axially spaced power drive means such as a wind or marine current turbine.

19 Claims, 3 Drawing Sheets

U.S. PATENT DOCUMENTS

| | | | | |
|---|---|---|---|---|
| 5,844,341 A | * | 12/1998 | Spooner et al. | 310/216 |
| 6,064,123 A | * | 5/2000 | Gislason | 290/55 |
| 6,147,415 A | * | 11/2000 | Fukada | 290/55 |
| 6,177,735 B1 | * | 1/2001 | Chapman et al. | 290/44 |
| 6,285,090 B1 | * | 9/2001 | Brutsaert et al. | 290/55 |
| 6,727,600 B1 | * | 4/2004 | Abdurachmanov | 290/54 |
| 6,833,633 B2 | * | 12/2004 | Wobben | 290/55 |
| 6,836,028 B2 | * | 12/2004 | Northrup et al. | 290/44 |
| 6,911,741 B2 | * | 6/2005 | Pettersen et al. | 290/44 |
| 6,952,058 B2 | * | 10/2005 | McCoin | 290/44 |
| 2003/0137149 A1 | * | 7/2003 | Northrup et al. | 290/44 |
| 2004/0101398 A1 | * | 5/2004 | Aloys | 415/4.1 |

FOREIGN PATENT DOCUMENTS

| | | |
|---|---|---|
| DE | 117986 | 7/1990 |
| DE | 4109693 | 10/1991 |
| DE | 129894 | 1/2001 |
| EP | 0627805 | 12/1994 |
| EP | 627805 A2 * | 12/1994 |
| GB | 2185290 | 7/1987 |
| WO | WO 205408 A1 * | 1/2002 |
| WO | WO 00/34650 | 6/2003 |

* cited by examiner (i)

(ii)

(iii)

ROTOR AND ELECTRICAL GENERATOR

This is a nationalization of PCT/GB02/02288 filed Jun. 5, 2002 and published in English.

BACKGROUND OF THE INVENTION

1. Field of the Invention

The invention relates to a rotor for an electrical generator and to an electrical generator incorporating such a rotor.

In particular the invention relates to a rotor for a low speed generator and to a low speed generator incorporating such a rotor, that is to say a generator in which a driving force is applied to a power means, and in particular a rotating power means such as a turbine, which is mechanically coupled to cause rotation of a rotor either by direct drive or via a low-ratio gearing.

The invention relates especially to the provision of large scale wind turbine generators and marine current turbine generators, and the prior art is discussed and examples of the invention are given in the context of the former in particular. However, it will be understood that the invention finds potential application generally in electrical generators where rotors experience high torque.

2. Description of Related Art

Most of the first commercial wind turbines used electrical generators that were adapted from general purpose induction motors. It was common practice to connect the turbine rotor shaft rotating at typically 50 rpm or less via a multi-stage gearbox providing high ratio gearing to a generator typically rotating at approximately 1500 rpm. However, multi-stage gearboxes are complex, heavy, costly, require maintenance and there have been reliability issues in wind turbine applications.

As the wind power industry has grown and the typical power ratings of turbines has been increased, new generator types have been developed to meet the specific demands of the sector. Recently, direct-drive generators, which eliminate the gearbox entirely, have emerged and captured a significant proportion of the market. These generators are designed to provide the required electrical output whilst rotating at the same speed as the turbine, thereby making the gearbox unnecessary. This simplifies the mechanical arrangement, potentially reducing costs and maintenance outage times.

In conventional direct drive generators of typical design, a large diameter bladed turbine, typically two or three blades, is axially spaced from and directly coupled via the turbine rotor shaft to a smaller diameter rotor. Direct-drive generators need to have a large diameter to compensate for the low rotational speed of the turbine and retain adequate peripheral speed of the generator rotor. Often the axial length of the generator is quite small. Direct-drive generators are therefore characterised by a disc-like appearance.

There is a general desire to introduce larger turbines to increase capacity and efficiency, particularly in relation to the introduction of large offshore wind farms. Existing direct-drive turbines will become impractical if simply scaled up from existing designs because of problems associated with manufacture, weight and transportation of components of such extreme dimensions.

Wind turbines of 2 MW rating are now available commercially and much larger generators are envisaged, mainly for the emerging offshore market. However, for example, a 5 MW direct drive generator would need to be approximately 15 meters in diameter and would be extremely heavy.

There are several problem areas arising from the size and weight of these generators. These include:

(i) the need for very large bore machine tools
(ii) high roofed workshops with large capacity cranes are needed
(iii) transportation of large out-sourced parts for assembly, or the finished generator. This is even more problematic for the export market
(v) installation at the tower head
(vi) tower head weight impact on other aspects of the wind turbine design U.S. Pat. No. 6,064,123 describes an alternative approach for wind turbine generators to the typical design of a larger diameter bladed turbine axially spaced from a smaller diameter rotor with or without a gearbox in between. In U.S. Pat. No. 6,064,123, the several large wind turbine blades which are normally used to extract power from the wind are replaced by a rotatably mounted central hub, a rim concentric with the hub and a plurality of blades disposed between the hub and the rim. The rotor of the generator is incorporated into this turbine structure by having a plurality of magnets disposed on the rim for generating current in the stator. This structure means that the rotor rim diameter is similar to the diameter of the blade arrangement.

Whilst this structure gives high peripheral speed relative to an equivalent conventional direct drive design, with the associated benefits of high peripheral speed, the extremely large structure with combined purpose exacerbates some of the above problems and creates problems of its own, and as a result fails to exploit or allow many of the other benefits identified with conventional direct drive design (for example in the use of two or three blades).

The heavy iron cores associated with conventional design direct drive generators also serve to exacerbate problems, in particular in relation to weight, efficiency losses, magnetic forces during assembly and air gap forces.

As the skilled person will appreciate, many of the above problems also arise in relation to other situations where large rotors, and in particular large disc rotors, are conventionally employed. In particular, similar problems arise in relation to the design of marine current turbine generators and the like.

SUMMARY OF THE INVENTION

It is an object of the present invention to provide a rotor for an electrical generator which has a structure such as to mitigate some or all of the above disadvantages, and an electrical generator incorporating such a rotor.

It is a particular object of the present invention to provide a rotor, and especially a rotor for a low speed generator driven directly or via a low-ratio gearing by a wind or marine current turbine, which can be economically fabricated on a large scale.

It is a particular object of the present invention to provide a rotor for an electrical generator, and an electrical generator incorporating such a rotor, which offers improved size to weight and/or power to weight performance.

Thus, according to a first aspect of the invention in its broadest concept, a rotor for an electrical generator comprises a central hub, a rim radially spaced therefrom and generally concentric therewith, and a plurality of elongate tension members extending generally between the hub and the rim, maintained substantially in tension so as to maintain the rim substantially in compression, and a plurality of magnetic elements mounted thereon disposed around substantially the entire rim at generally even spacing, the hub being mountable to be rotatably driven by a remote, and in particular an axially spaced turbine.

The rigidity given to the structure in accordance with the invention by a rim maintained in compression and generally radial struts or spokes maintained in tension is sufficient for the rotor and confers significant weight reduction compared with conventional approaches for rotors.

The structure thus lends itself to construction of large scale rotors for application in low speed electrical generators, where the rotor is either directly driven or driven through a low-ratio gearbox, and for example a single stage gearbox. The previously mentioned problems involved in the provision of multi-stage high ratio gearings in the prior art can be dispensed with. The structure thus lends itself in particular to rotors which serve as an alternative to the large disc rotors conventionally employed in direct-drive generators such as wind or marine current turbines.

The structure can be employed in conjunction with any suitable design of low speed and in particular direct drive wind or marine current turbines consisting of power drives in the form of large diameter bladed turbines which are axially spaced from and operatively coupled via the turbine rotor shaft to the hub of the rotor in a conventional manner, either via a low ratio for example single stage gearbox or more preferably directly via an ungeared mechanical coupling. Typical applications are described with reference to horizontal axis turbines, but the invention is not so limited, being applicable in principle to vertical axis turbines or any other practical turbine arrangement where the advantages it offers might be relevant.

The structure contrasts with the alternative proposed in U.S. Pat. No. 6,064,123 which has a circular rotor/turbine arrangement but in which the generator mechanism is integral with the turbine blades. This means that the rotor rim diameter is similar to the diameter of the blade arrangement, so that the system fails to exploit or allow many of the other benefits identified with conventional direct drive design (for example in the use of two or three blades). By contrast, the present invention admits these benefits in admirable manner and describes a rotor structure which does not incorporate blades or any other means to extract power from the wind or water. In particular blades are not mounted on the tension members. It is solely a rotor (or in combination with stator and electrical take off a generator) adapted to be used in conjunction with any other suitable power drive means such as a bladed turbine to extract power from the wind or water flow.

In accordance with the invention, at least one magnetic rotor element is disposed on the rim. The magnetic elements may be disposed on an inner or outer surface of the rim. The rotor comprises a plurality of magnetic elements disposed substantially fully around the rim, and generally evenly spaced thereon. These may be in the form of a plurality of discrete magnets, or in the form of differently polarized zones in a larger magnet, or in the form of coils or in some combination thereof.

The plurality of magnetic elements are suitably located and polarised to create a multipolar distribution of magnetic flux in the space surrounding the rotor. For example the magnets may be disposed along the rim on an outer or inner surface of the rim and polarised radially, axially, or a combination of both, with a resulting flux distribution containing radial and/or tangential and/or axial components.

The structural rim of the rotor may be circular for simplicity, or may be polygonal, and in particular though not necessarily polygonal having a large number of sides to approximate to circularity. References herein to circumferential aspects of the rim, or to an arc of the rim, or to a radial direction should be construed accordingly as including references to the perimeter of such a polygon or a portion thereof or a direction from centre to edge thereof as the case may be.

The rim may be of unitary construction, or may be of modular construction, comprising a plurality of arc sections or sides of a polygonal rim as the case may be. The rim may be of solid construction, or of open frame construction for example in the form of a truss or like structure, provide such structure is suitably constructed to allow the rim to be maintained substantially in compression in accordance with the principles of the invention.

The tension members extend generally radially from the hub to the rim. Preferably however, the tension members are not directly radial, but are axially offset and tangentially sloping. This arrangement will be familiar, and will be understood to provide improved transmission of torque within the structure when it is rotating. Preferably, tangentially sloping tension members are used so disposed as to resist torque in either direction. The arrangement may be asymmetric so as to resist torque more in one direction than the other. The whole structure being prestressed, however, is more conveniently designed to be symmetrical and torque is transmitted by virtue of increased tension in the spokes that slope tangentially in one direction and reduced tension in spokes that slope tangentially in the opposite direction.

The tension members are arranged in a radial or tangential pattern generally in the plane of rotation. However, the tension members are preferably sloping to some extent relative to the plane of rotation in an axial direction, allowing the structure to resist axial forces.

Preferably, the rotor magnetic elements comprise a plurality of magnets, and in particular a plurality of magnets in alternate multi-polar arrangement, which are preferably disposed at substantially even spacing around one surface and in particular an outer surface of the rim. Alternatively, the plurality of magnets are arranged with identical polarisation to create an array of magnetic poles of one polarity with intermediate consequent poles of opposite polarity.

Preferably the magnets are permanent magnets of a material exhibiting very high coercive force. Suitable materials will suggest themselves to those skilled in the art, and include high coercive force ferrite, sintered neodymium-iron-boron, iron-boron and the like. Additionally or alternatively, magnets may be provided as non-permanent magnets, for example as wound coils.

The magnets may be attached to the rim in any suitable manner for example glued or fitted into recesses in the rim. In this latter case, magnetic forces contribute to retention, and may be sufficient alone.

The rim needs to exhibit adequate structural properties in compression but preferably also comprises ferromagnetic material. Preferably, the rim is fabricated from a ferromagnetic material exhibiting good properties in compression, such as a magnetic steel. Additionally or alternatively, the rim may comprise a structural portion fabricated from material selected for strength in compression, and a magnetic element mounting portion attached thereto to provide a mounting for the magnetic elements, and comprising a material having suitable ferromagnetic properties.

The elongate tension members comprise struts, spokes or the like, and are in the form of material strong in tension assembled as a wire, cable or rods to be used in tension. The tension members are of any material susceptible of being pre-stressed and maintained in tension in the finished structure, so as to maintain the rim in compression for rigidity. Suitable materials include steel, glass fibre, carbon fibre, kevlar or other high strength fibre. The hub is of any suitable structural material, such as steel.

The invention provides a physical structure for a direct-drive generator of large diameter unrestricted by the constraints listed earlier.

In accordance with a second aspect of the invention, an electrical generator comprises a rotor as hereinbefore described. In particular, an electrical generator in accordance with the invention comprises a rotor as hereinbefore described, and a suitable stator arrangement. The rotor and stator may be disposed for any flux distribution.

Accordingly, the generator comprises at least one rotor in accordance with the first aspect of the invention co-operatively arranged with at least one suitable stator such as to generate electrical energy from mechanical energy attributable to rotation of the rotor, the rotor being mountable to be rotatably driven relative to a statically mounted stator by a remote, and in particular an axially spaced, turbine.

The turbine provides the driving power for the rotor and comprises any suitable drive means in which power is produced by the action of a fluid incident thereon. The turbine is in use operatively coupled to the rotor to cause it to rotate. This may be directly or indirectly through suitable gearing or other transmission system.

Preferably, the electrical generator is a low speed generator in which a driving force is supplied from a driven power means, and in particular a rotating power means, which is operatively mechanically coupled to the hub to cause rotation of a rotor via a low ratio gearing, for example at a ratio between 1:1 and 1:10, which may be in the form of a single stage gearbox. More preferably, the electrical generator is a direct-drive generator in which a driving force is supplied from a driven power means, and in particular a rotating power means, which is directly mechanically coupled to the hub to cause rotation of a rotor (i.e. at 1:1 gearing). The invention relates in particular to the provision of large scale wind turbine generators and marine current turbine generators.

An alternative means of coupling comprises one or more flexible tension members connected between the rotor rim and each blade of the turbine, for example at positions intermediate between the turbine hub and turbine blade tip. By this means force exerted by the blades is transferred to the rotor without imposing high bending moments in the blades near their attachment to the turbine hub. The tension members in the generator rotor structure are then not required to transmit torque, so are less highly stressed in service. The power drive means is a fluid driven turbine adapted to be caused to rotate by a stream of fluid incident thereon, and operatively coupled to the rotor such that movement of the fluid driven means causes rotation of the rotor. In particular, the fluid driven means comprises a fluid driven rotator, which is rotatable under the action of incident fluid. Preferably, the fluid driven rotator is a wind or marine current turbine.

In the preferred embodiment, the generator is a directly driven generator, so that the wind or marine current turbine or other fluid driven rotator is directly coupled to the rotor such that rotation of the fluid driven rotator imparts an equal rotation to the rotor. Any suitable conventional structure may be employed. For example, the rotator may comprise a plurality of blades rotatable under action of the incident fluid mounted on a central axis.

Preferably, the turbine or other fluid driven rotator is coaxial with the rotor, particularly where the rotor is directly driven.

In a preferred embodiment, the stator is configured to be seated in the vicinity of the said rim for at least an arc thereof and possibly for substantially all the circumference thereof. In a particular preferred embodiment, the stator circumferentially surrounds the rotor for the said arc or circumference, although an alternative structure in which the rotor circumferentially surrounds the stator can be envisaged.

Preferably, both rotor and stator extend circumferentially around concentric support structures, for substantially all the circumference or at least an arc thereof in the case of the stator. In particular, the stator circumferentially surrounds the rotor, although an alternative structure in which the rotor circumferentially surrounds the stator can be envisaged.

In a particularly preferred embodiment, a stator support structure is provided which circumferentially surrounds the rotor rim. In particular, the support structure supports a plurality of stator coils disposed to form a cylinder surrounding and coaxial with the rotor and the axis of each coil is directed towards the axis of the rotor. The rotor comprises a plurality of permanent magnets disposed circumferentially around the rotor rim and polarised radially to create a multi-polar distribution of magnetic flux, and the stator structure supports a set of coils similarly directed radially, such that, as the rotor turns, the flux linkage with each coil changes cyclically and an alternating emf is induced in each coil. In the alternative, the rotor rim may circumferentially surround the stator support, magnets being disposed inwardly on the former and stator coils outwardly on the latter.

In the preferred embodiment as described above, the stator coils are disposed circumferentially around the rotor on a support structure. Any suitable stator support structure may be envisaged. Conveniently, the stator support structure may comprise a similar open structure to that of the rotor, that is a central hub, a circular or possibly polygonal rim, and radially extending tension members extending therebetween and maintained substantially in tension to maintain the rim substantially in compression. Rotor and stator supports may then be coaxially mounted to provide a suitable concentric and relatively rotatable rotor and stator arrangement.

A ferromagnetic stator core may be provided to enhance the flux provided by the permanent magnets, as is conventional in prior art systems, including direct-drive generators for wind turbines. However, the rotor and the stator core then experience a strong magnetic attractive force. Normally the magnetic attractive force is the largest force imposed on the rotor and stator structure as assembled and their structural design is determined by the need to withstand this force. If the stator core is omitted, the attractive force is absent and a much lighter structure can be used. Surprisingly, this is found to give quite adequate electromagnetic performance, the relatively low flux density in the ironless stator being more than compensated by the relatively high relative speed of the magnets at the rim of the large diameter rotor.

In one embodiment of the invention therefore, the stator arrangement is coreless; that is, no iron core is provided on the stator. In alternative embodiments, a conventional iron core may remain desirable.

BRIEF DESCRIPTION OF THE DRAWINGS

Several alternative electromagnetic topologies may be employed and will readily suggest themselves to those skilled in the art. The invention is described with regard to its application with one particular example with reference to FIGS. 1 to 3 of the accompanying drawings.

FIG. 2(i) shows a cantilevered stator. FIG. 2 (iii) shows a stator with rigid supports.

The examples all employ radially polarised magnets, dispense with an iron core on the stator, and employ the structure of the invention for both rotor and stator. It will be readily understood however that the invention is equally applicable in principle to other magnetic geometries, and/or to iron cored or coreless stator arrangements, and that a rotor in accordance with the structure of the invention could be used in association with any suitable stator, such as one extending circumferentially for only an arc around the rotor.

DETAILED DESCRIPTION OF THE INVENTION

Figure 1:
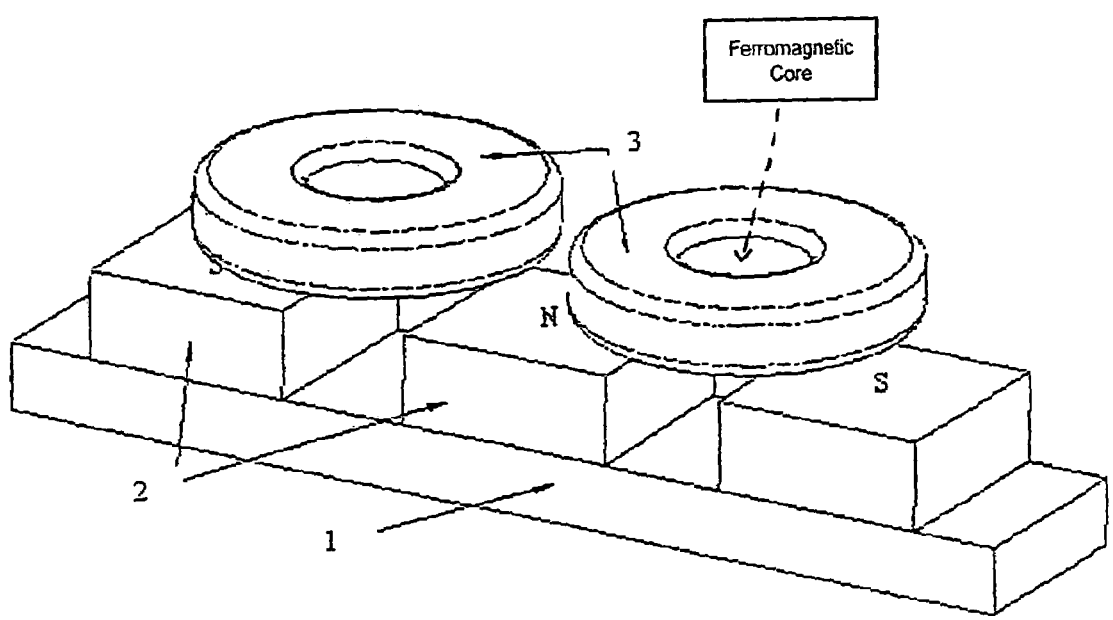
FIG. 1 depicts an electromagnetic configuration of a rotor and stator.

A preferred electromagnetic configuration is as shown in FIG. 1. In this example a ferromagnetic cylinder (1) makes up the rotor back iron and carries neodymium-iron-boron permanent magnets (2) on its outer surface. These may be fixed in any suitable manner, for example using adhesive, but the magnetic forces alone might be sufficient to retain the magnets in position. The magnets are polarised radially and create a multipolar distribution of magnetic flux in the space surrounding the rotor. The stator structure supports a set of copper coils (3), whose axes are directed radially, on a non magnetic backing (not shown). Adhesive or other fixing may be used to fix them in place. Coils may be embedded in the support structure. This will provide good electrical insulation.

As the rotor turns the flux linkage with each coil changes cyclically and alternating emf is induced in each coil. In contrast to prior art systems, no iron core is provided for the reasons set out above.

Conventionally, a ferromagnetic stator core is generally provided to enhance the flux provided by the permanent magnets. However, it has been found in accordance with the invention that if permanent magnets of sufficient coercive force are used, this enhancement is unnecessary, and adequate flux linkage occurs even without a core. Omission of the core greatly reduces the magnetic attractive force experienced by the structure so that a much lighter structure can be used and the advantages of the open structure of the present invention can be exploited to the full. For this reason, the magnets (2) are fabricated from sintered neodymium-iron-boron to provide the necessary coercive forces.

Figure 2:
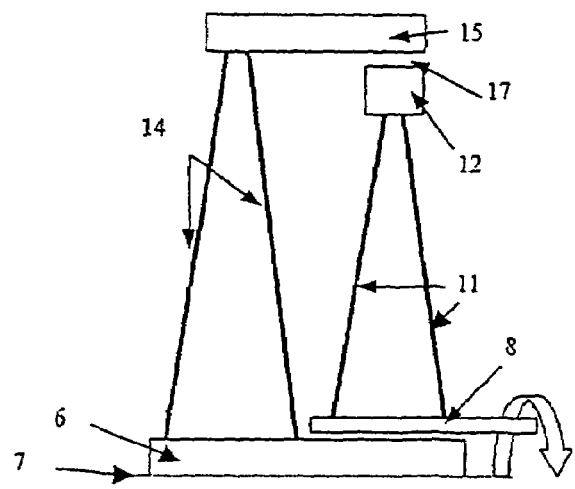
FIG. 2 (ii) shows a double sided stator.
Figure 2:
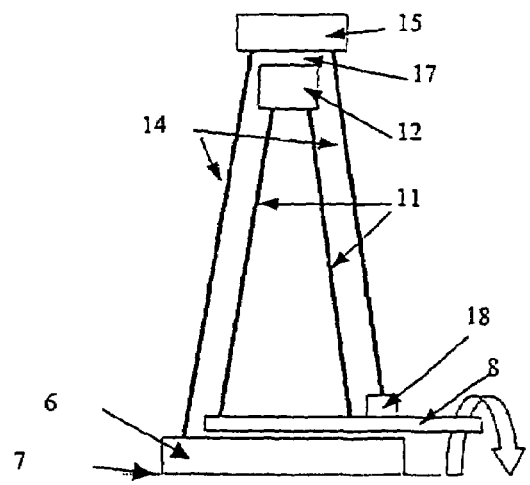
Figure 2:
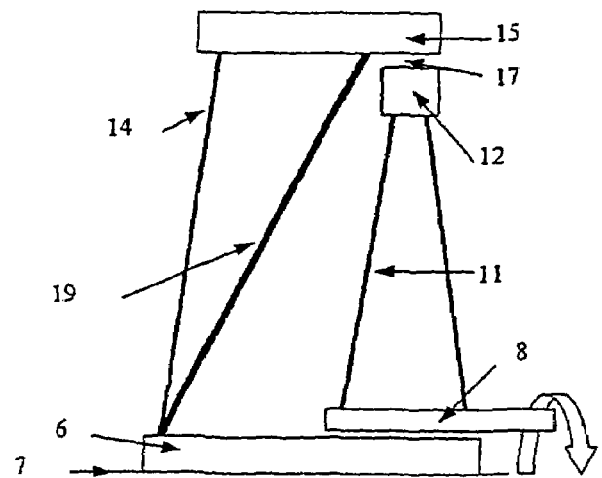

In the preferred embodiment, both the stator support structure and the rotor structure are based on the same open principles of rim in compression with radially extending tension members. Three possible arrangements are shown in FIG. 2.

In each case like references are used for like components. A central shaft (6) with centre line (7) is shown on which the hub (8) is mounted for rotation in direction of the arrow. Rotor spoking (11) extends to a rotor rim (12). Stator spoking (14) extends to a stator rim (15) concentic with the rotor rim (12). An air gap (17) is provided between the rotor rim (12) and stator rim (15). The designs differ in overall arrangement of these common components, and also in that 2(ii) is provided with a bearing (18) and 2(iii) incorporates rigid stator supports (19) which are maintained in compression.

Figure 3:
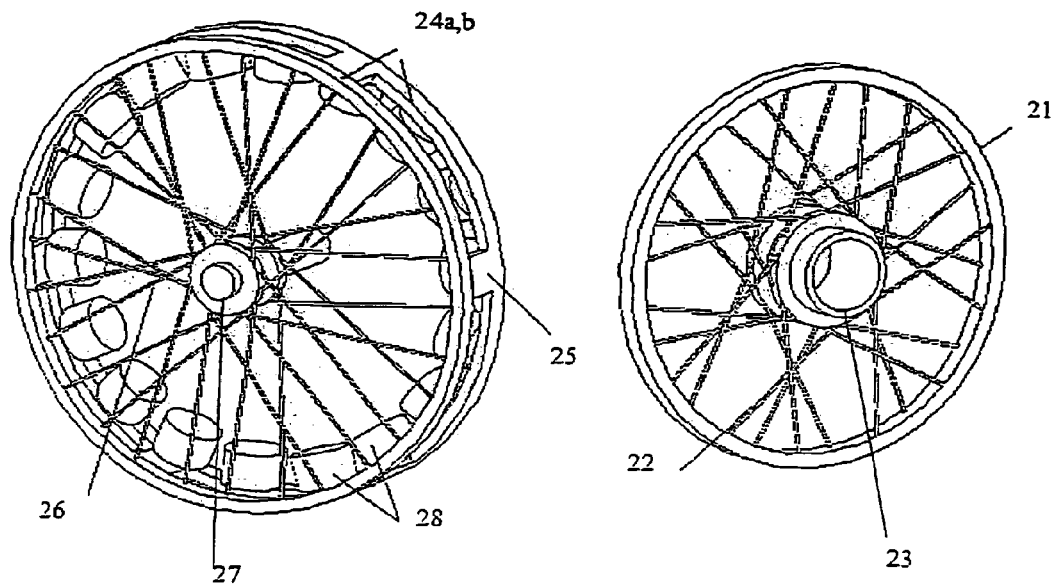
FIG. 3 shows a rotor and stator structure in accordance with the first arrangement of FIG. 2 is illustrated both in exploded (FIG. 3a) and in assembled (FIG. 3b) view.
Figure 3:
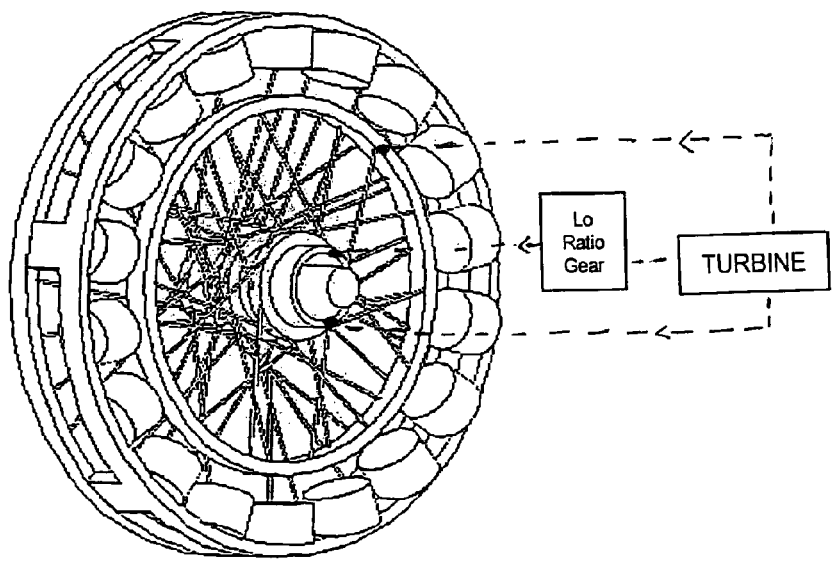

In FIG. 3, the rotor support structure is shown comprising a circular rim (21) maintained in compression by spokes (22) connected to a central hub (23). Permanent magnets (not shown) are mounted on the rim (21) in the manner indicated in FIG. 1.

A stator arrangement is shown comprising a pair of rims (24a), (24b) linked by cross members (25), and maintained in compression by spokes (26) in tension extending to a central hub (27). Coils (28) are mounted on an inner surface of the first rim (24a).

This is just one example of structure and other structures will suggest themselves.

In most preferred structures, both stator structure and rotor structure of the generator are based on one or more outer circular (or possibly polygonal) members acting in compression, which are connected to the central hub/wind turbine rotor arrangement by circular arrays of members acting in tension rather like the spokes of a bicycle wheel. The embodiments illustrate this. The tension members are arranged in a radial or tangential pattern in the plane of rotation, and are sloping in the axial direction, thus allowing the stator and rotor structures to resist torque and any axial forces. When tangentially sloping tension members are used, these can be arranged to resist torque in either direction. In some embodiments the plane containing the rim may not lie between the planes containing the rings at which the spokes are secured to the hub. In these cases it is necessary to replace one set of tension members by compression members.

Other arrangements applying the principles of the invention will be readily envisaged.

The invention claimed is:

1. An electrical generator comprising:
   a rotor comprising a central hub, a rim radially spaced therefrom and generally concentric therewith, and a plurality of elongate tension members extending generally between the hub and the rim, said tension members pre-stressed to be maintained in tension so as to maintain the rim substantially in compression, and a plurality of magnetic elements disposed substantially fully around the rim and generally evenly spaced thereon;
   at least one stator co-operatively arranged relative to said rotor such as to generate electrical energy from mechanical energy attributable to rotation of the rotor, wherein said stator comprises a central hub, a rim radially spaced therefrom, and a plurality of tension members maintained in tension extending generally between the hub and the rim so as to maintain the rim substantially in compression;
   and a turbine remotely spaced from said rotor, said turbine comprising a wind or marine current turbine;
   wherein the rotor is mounted to be rotatably driven relative to said statically mounted stator by the remotely spaced turbine.

2. An electrical generator in accordance with claim 1 wherein the plurality of magnetic elements of the rotor are disposed around the rim thereof and polarised radially.

3. An electrical generator in accordance with claim 1 wherein the plurality of magnetic elements of the rotor are disposed around the rim thereof and polarised axially.

4. An electrical generator in accordance with claim 1 wherein the rotor magnetic elements comprise a plurality of permanent magnets.

5. An electrical generator in accordance with claim 1 wherein the stator comprises a plurality of wound coils.

6. An electrical generator in accordance with claim 5 wherein the stator coils are provided in association with one or more ferromagnetic stator cores to enhance the flux provided with the magnetic elements.

7. An electrical generator in accordance with claim 1 wherein the tension members of the rotor extend generally radially from the hub to the rim but are axially offset and tangentially sloping to resist axial forces and torque.

8. An electrical generator in accordance with claim 1 wherein the stator is configured to be seated in the vicinity of the rim of the rotor for at least an arc thereof.

9. An electrical generator in accordance with claim 8 wherein the stator is configured to be seated in the vicinity of the said rim for substantially all the circumference thereof.

10. An electrical generator in accordance with claim 9 wherein the stator coils are disposed circumferentially around the rotor rim, the rotor and stator supports being coaxially mounted to provide a concentric and relatively rotatable rotor and stator arrangement.

11. An electrical generator in accordance with claim 10 wherein the stator structure fully surrounds the rotor structure with one side of the stator structure being mounted on a rotating bearing.

12. An electrical generator in accordance with claim 10 wherein the stator structure approaches the rotor structure from one side thereof in cantilever fashion.

13. An electrical generator in accordance with claim 1 wherein the stator coils are provided without a ferromagnetic stator core or cores.

14. An electrical generator in accordance with claim 1 comprising a low speed generator in which the turbine is operatively mechanically coupled to the hub to cause rotation of the rotor via a low ratio gearing.

15. An electrical generator in accordance with claim 1 comprising a direct drive generator in which the turbine is directly mechanically coupled to the hub to cause rotation of the rotor.

16. An electrical generator in accordance with claim 1 comprising a direct drive generator in which the turbine is directly mechanically coupled to the rim to cause rotation of the rotor.

17. An electrical generator in accordance with claim 1 wherein said turbine forms no part of said rotor.

18. An electrical generator in accordance with claim 1 wherein said rotor hub, rotor rim, and elongate tension members extending therebetween are rotatable in a circular path and said turbine is axially separated from said circular path.

19. An electrical generator as claimed in claim 1 wherein said elongate tension members are free of any turbine components.

* * * * *